United States Patent [19]

Hatakeyama et al.

[11] Patent Number: 5,805,446
[45] Date of Patent: Sep. 8, 1998

[54] METHOD FOR FACILITY LOCATION

[75] Inventors: Tomoko Hatakeyama, Tokyo; Shigeru Kakumoto, Kodaira; Takatoshi Kodaira, Musashino, all of Japan

[73] Assignee: Hitachi, Ltd., Tokyo, Japan

[21] Appl. No.: 517,128

[22] Filed: Aug. 21, 1995

[30] Foreign Application Priority Data

Aug. 19, 1994 [JP] Japan ..................................... 6-195117

[51] Int. Cl.⁶ ............................ G05B 13/02; G06F 16/00
[52] U.S. Cl. .................... 364/148; 364/468.05; 395/207; 395/208
[58] Field of Search ................................ 364/148–150, 364/152–154, 156, 468.01, 468.03, 468.05, 512, 578; 395/201, 207, 208, 209, 210, 611–616

[56] References Cited

U.S. PATENT DOCUMENTS

| | | | |
|---|---|---|---|
| 5,235,506 | 8/1993 | O'Brien, Jr. | 395/208 |
| 5,402,335 | 3/1995 | O'Brien | 395/208 |
| 5,416,694 | 5/1995 | Parrish et al. | 395/208 |

OTHER PUBLICATIONS

An Analysis for Spatial Spread and Local Availability of Facilities using Geographical Information System which contains Town Map Data; Tetsuma Furihata and Koji Matsuoka; Department of Management Science, Science University of Tokyo; pp. 46–49.

Facility Location Planning Based on Information of Individual Users; Tomoko Hatakeyama, Shigeru Kakumoto; Central Research Laboratory, Hitachi, Ltd.; pp. 27–32.

Pattern Information Processing; Makoto Nagao; Corona Publishing Co., Ltd.; pp. 112–121.

Network Analysis; Modeling network systems; Environmental Systems Research Institute, Inc.

GIS by ESRI; Version 2 ArcView GIS for Everyone; Environmental Systems Research Institute, Inc.

GIS by ESRI; Revision 7 ARC/INFO; Georgraphic Information System Analysis & Data Management; Environmental Systems Research Institute; Inc.

*Primary Examiner*—Reba I. Elmore
*Assistant Examiner*—Thomas E. Brown
*Attorney, Agent, or Firm*—Antonelli, Terry, Stout, & Kraus, LLP

[57] ABSTRACT

An information processing apparatus and a method being performed in the information processing apparatus which includes an input device, an output device, a memory having stored therein geographic information of a region including positional information of existing facilities in the region and positional information of users of the facilities and an information processing device for processing the geographic and positional information. The information processing device performs various processing steps using the geographic information to locate the facilities in the region such that the access times required by the users to access the facilities are within a permissible range.

26 Claims, 9 Drawing Sheets

FIG. 6

| FACILITY DATA | RESIDENT DATA | ROAD DATA | OTHER DATA |
|---|---|---|---|
| FIRE EXTINGUISHER 1 | RESIDENT 1 | ROAD 1 | RIVER 1 |
| DATE OF INSTALLATION | ADDRESS | WIDTH | WIDTH |
| X-COORDINATE | NAME | X-COORDINATE | X-COORDINATE |
| Y-COORDINATE | AGE | Y-COORDINATE | Y-COORDINATE |
| Z-COORDINATE | OCCUPATION | - - - | - - - |
| - - - | - - - | X-COORDINATE | X-COORDINATE |
| FIRE EXTINGUISHER 2 | RESIDENT 2 | Y-COORDINATE | Y-COORDINATE |
| DATE OF INSTALLATION | ADDRESS | ROAD 2 | |
| X-COORDINATE | NAME | WIDTH | |
| Y-COORDINATE | AGE | X-COORDINATE | |
| Z-COORDINATE | OCCUPATION | Y-COORDINATE | |
| - - - | - - - | - - - | |
| | | X-COORDINATE | |
| | | Y-COORDINATE | |

- - - - BORDER OF USER AREA
⌂  HOUSE
▯  FIRE EXTINGUISHER
——  ROAD
////  RIVER
)(  BRIDGE

800 ▨ AREA WHERE ACCESS TIMES EXCEED PERMISSABLE RANGE

900 ◍ CLUSTERS OF RESIDENTS WHOSE ACCESS TIMES EXCEED PERMISSABLE RANGE

◻ FIRE EXTINGUISHER

⦸ CLUSTERS OF RESIDENTS WHOSE ACCESS TIMES EXCEED PERMISSABLE RANGE

● CENTER OF CLUSTERS

○ CLUSTER OF RESIDENTS WHOSE ACCESS TIMES ARE REDUCED

----  BORDER OF USER AREA

FIG. 12A
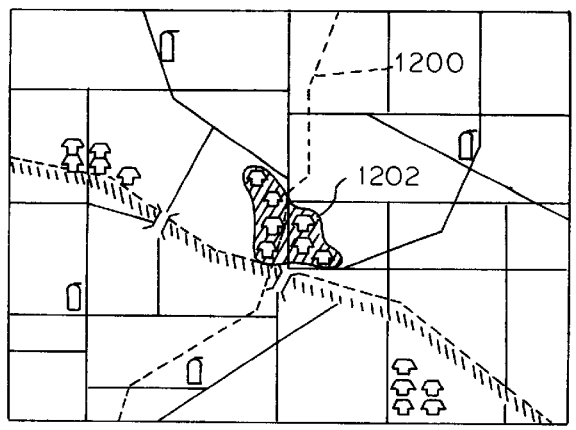
FIG. 12B
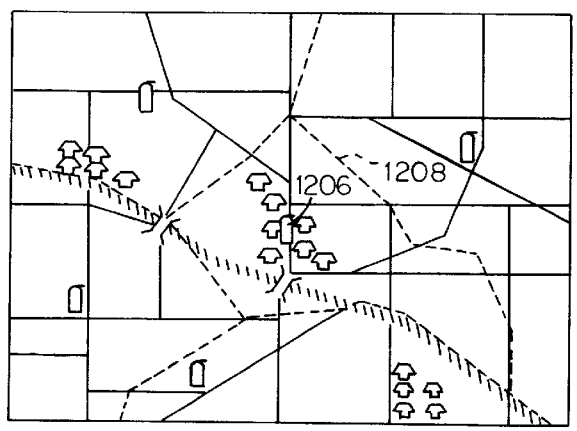
〔 FIRE EXTINGUISHER
---- BORDER OF USER AREA
⟳ HOUSE
⊘ CLUSTER OF RESIDENTS WHOSE
  ACCESS TIMES EXCEED PERMISSABLE RANGE
— ROAD
⧹⧹⧹⧹ RIVER
)( BRIDGE

METHOD FOR FACILITY LOCATION

BACKGROUND OF THE INVENTION

The present invention relates to a method and apparatus for locating public facilities, disaster provisions, chain stores and others. More particularly, the present invention relates to a method and apparatus for locating public facilities, disaster provisions, chain stores and others in a manner so as to reduce the access times required by users to access the facilities to a permissible range.

In order to locate facilities, such as public facilities, disaster provisions and stores, an evaluation must be made to determine whether existing facilities are sufficiently close to users in a region. For an area remote from any of the existing facilities, relocation and expansion of the existing facilities or set up of new facilities must be carried out to improve their availability to users. The evaluation is carried out for individual unit areas, such as squares demarcated by a mesh provided on an administrative district or geographical map or calculated user areas of facilities.

For example, as described in Furihata, et al., "An Analysis for Spatial Spread and Local Availability of Facilities using Geographical Information System which Contains Town Map Data" Papers and Proceedings of the Geographic Information Systems Association, vol. 1/1992, an analysis is performed based on the location of existing fire extinguishers for public use installed in a region. The location of the existing fire extinguishers is tested to determine the size and location of the user areas for the fire extinguishers and whether the number of fire extinguishers relative to users in each of the user areas is within a permissible range. The planner of the facility location planning system installs new fire extinguishers within or around the user areas where the number of existing fire extinguishers fall below the permissible range.

A conventional method for facility location has the following problems. Firstly since information on user positions, namely actual geographical positions of individual users and household are not addressed or the representative points indicating the positions of the users in each square demarcated by a mesh are not addressed access times required by the users to access the facilities cannot be calculated accurately. The squares of the mesh are usually of a regular size and used to divide the area into small pieces. Further, because attribute information of the users, such as age, physical disabilities and the like, is not considered, variations of the times required for the users to access a facility due to age difference, physical disabilities or the like are not reflected in the analysis. Furthermore, the results of analysis are not applied to each user.

Thus, the conventional method has no ability to determine whether or not there are users whose access times to the facilities exceed the permissible range and to locate their positions. Therefore, it is difficult to accurately determine the locations where relocation, establishment and expansion of facilities are needed.

Further, conventionally positional and attribute information of the users are handled in small units, e.g., individual users. Thus, calculation of the access times for the users to go to all facilities entails a large amount of complex processing time, requiring a long time to find the users whose access times required to reach the facilities exceed the permissible range.

SUMMARY OF THE INVENTION

An object of the present invention is to provide a facility location method and apparatus, which can accurately locate an area where relocation, set-up and expansion of facilities are needed, by performing processing operations on positional and attribute information of users of facilities in user areas so as to calculate and evaluate the access times required for the users to access the facilities according to actual user units, such as individual users or households.

Another object of the present invention is to provide a facility location method and apparatus for planning the location of facilities within a reasonable time.

The present invention provides an information processing apparatus which includes an input device for inputting data, an output device for outputting data, a memory having stored therein geographic information of a region including positional information of existing facilities in the region and positional information of users of the facilities and an information processing device for processing the geographic and positional information so as to locate a plurality of facilities in the region such that the access times required by users to access the facilities are within a permissible range.

The information processing device calculates user areas corresponding to the facilities using said geographic information, determines for each user area which of the users belongs to the user area, calculates for each user of each user area an access time required by the user to access a facility belonging to the user area, judges whether the access time of each user of each user area is within the permissible range, determines a group of users for each user area whose access times exceed the permissible range, calculates a point representing a position of the group of users whose access times exceed the permissible range, and establishes a facility at the point or relocates a facility in the user area to which the group of users whose access times exceed the permissible range belongs, such that the access times for each user of the group of users whose access times exceed the permissible range come within the permissible range.

The information processing device calculates the access times required for each of the users to reach a facility by referring to not only positional information of the users but also to attribute information of the users, such as physical disabilities or the like. Thus, it is possible to determine the access time for each user as close as possible to the actual access time for the user, thereby allowing for accurate evaluations.

Further, by using such near accurate data in evaluating access times for individual users, it is possible to determine the positions of the users whose access times exceed the permissible range and thereby locate places where establishment, relocation and expansion of a facility is needed.

In the present invention when a user area for a facility and a user area to which each user belongs is determined, it is possible to determine a facility that the individual users would most likely use, making it only necessary to calculate and evaluate the access times to such facility. This feature of the present invention minimizes the length of time taken to identify the users whose access times to the facility exceed the permissible range.

BRIEF DESCRIPTION OF THE DRAWINGS

The present invention will be more apparent from the following detailed description, when taken in conjunction with the accompanying drawings, in which:

FIG. 6 is a diagram showing the data structure of geographical information used in the present invention;

FIGS. 12A and 12B are diagrams of a display illustrating a process of installing facilities according to the present invention.

DETAILED DESCRIPTION OF THE PREFERRED EMBODIMENT

Figure 1:
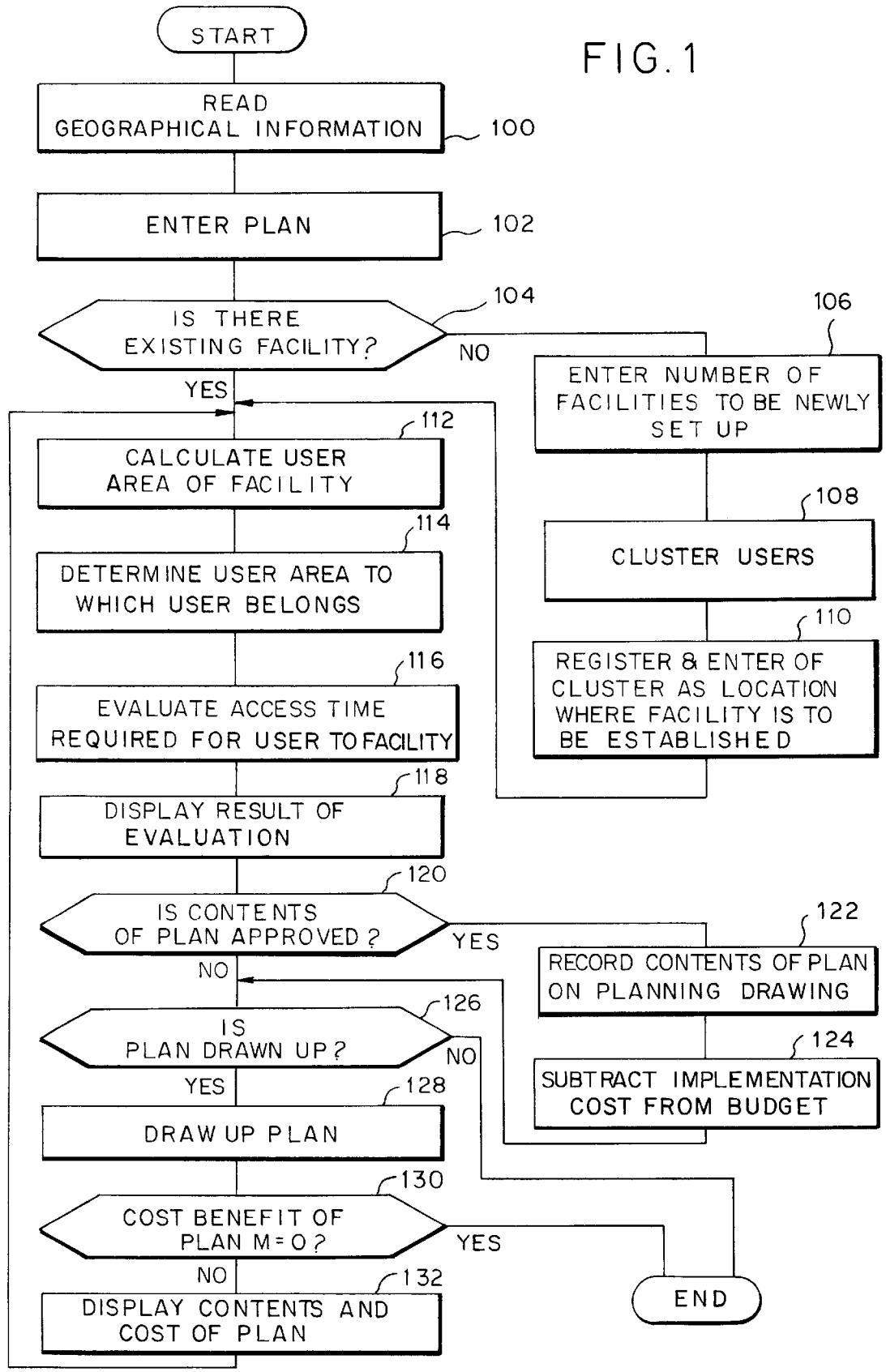
FIG. 1 is a flowchart showing the processing steps of the present invention.
Figure 2:
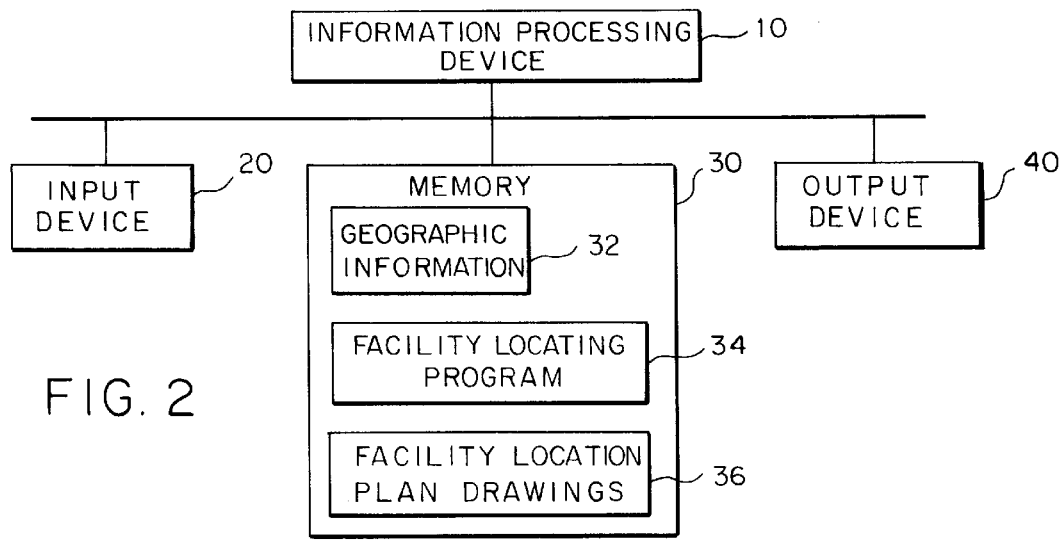
FIG. 2 is a schematic diagram of the information processing apparatus of the present invention.
Figure 3:
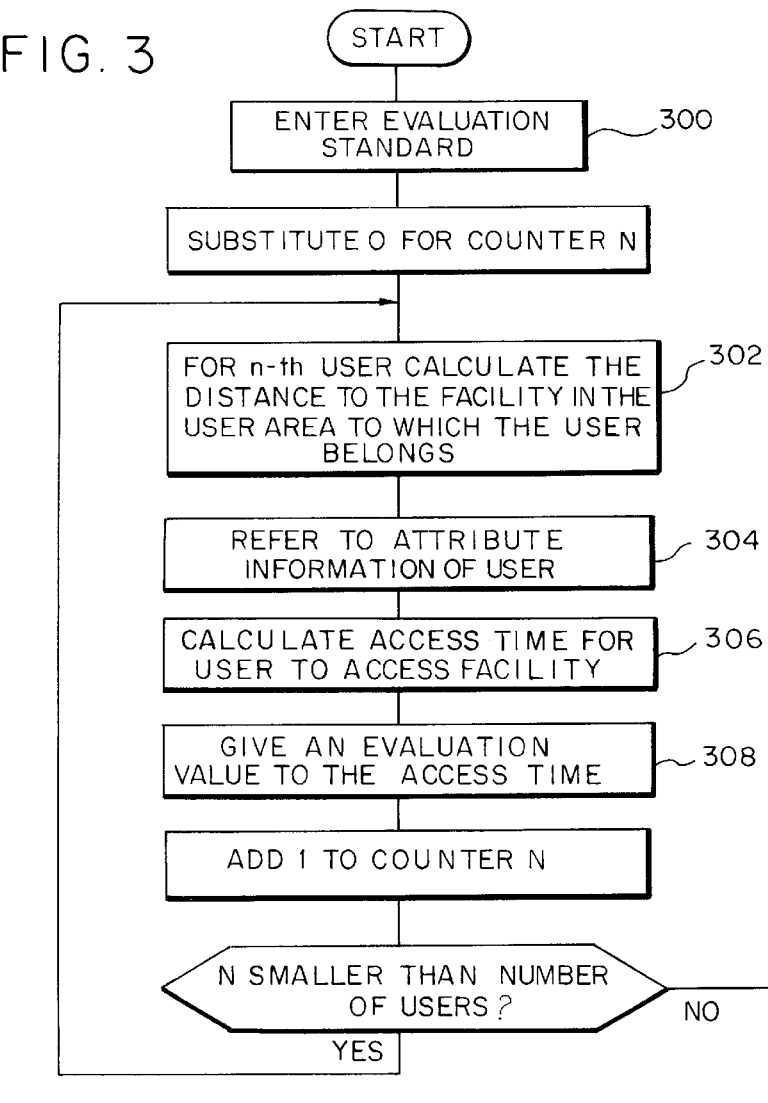
FIG. 3 is a flowchart showing the details of the evaluation step performed by the present invention.
Figure 4:
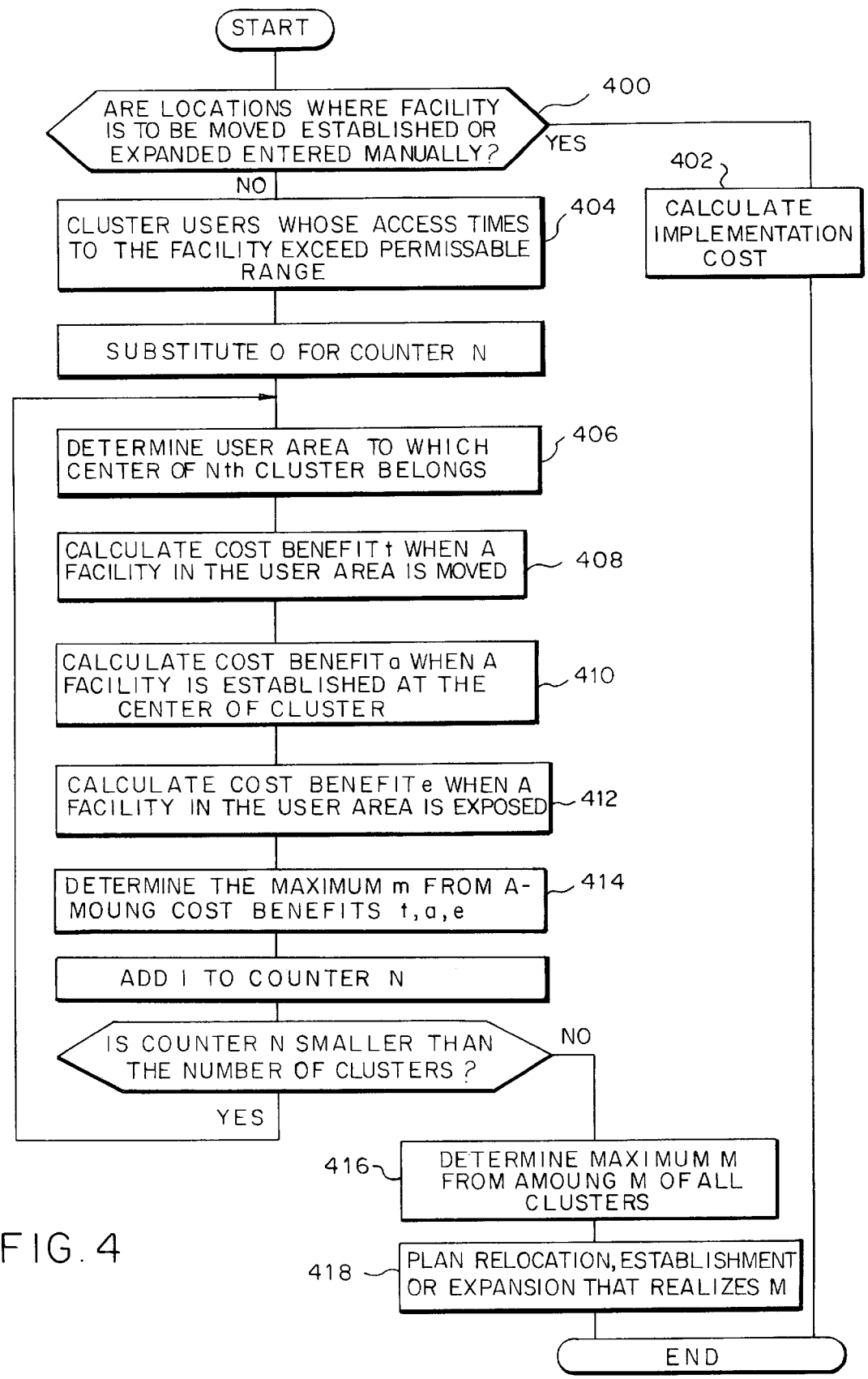
FIG. 4 is a flowchart showing the details of the relocating step performed by the present invention.
Figure 5:
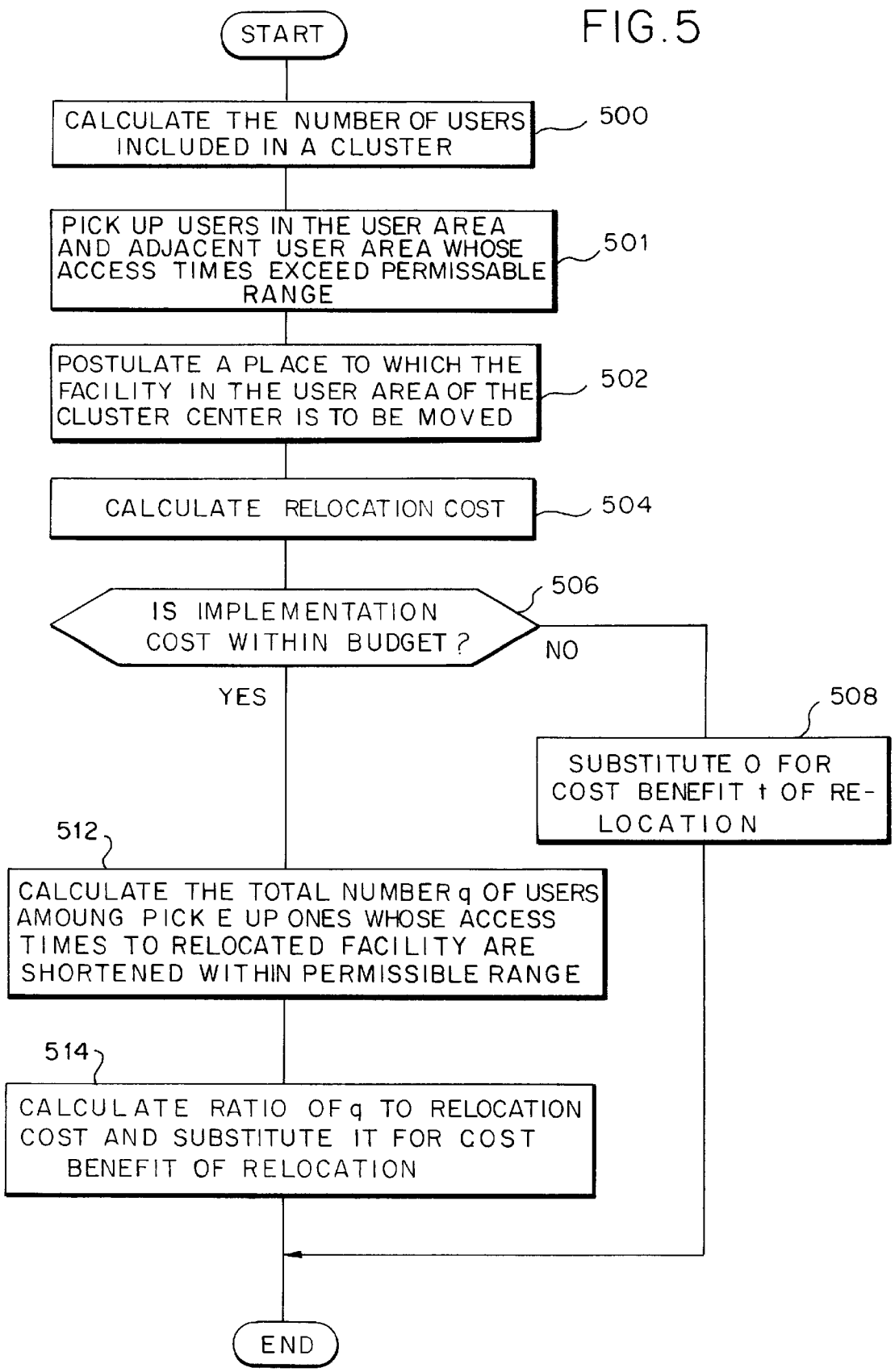
FIG. 5 is a flowchart showing the details of evaluating cost benefits of relocating performed by the present invention.

FIG. 1 shows the overall processing steps performed by the present invention. FIG. 2 shows the configuration of the apparatus used to implement the present invention. FIGS. 3 to 5 are flowcharts showing the details of various parts of the overall processing steps performed by the present invention. FIG. 6 shows an example of the data structure of geographical information used in the present invention. FIGS. 7A, 7B to 12A and 12B are examples of displays showing the process of planning facility location according to the present invention.

Referring to FIGS. 1 and 2, a process flow is explained for a case where the present invention is applied a design support system for disaster provision location planning. Here, fire extinguishers for public use managed by a local government are assumed to be an example of disaster provisions.

The processing steps of the present invention are implemented by an information processing apparatus illustrated in FIG. 2. As shown in FIG. 2 the information processing apparatus includes an input device 20 for inputting data from a user, an output device 40 for outputting data to the user and a memory 30 having stored therein geographic information 32 of a region including positional information of existing facilities in the region and positional information of users of the facilities in the region, a facility locating program 34 for locating when executed facilities within a region and facility location plan drawings 36 providing maps of the locations of the facilities in the region.

The information processing apparatus illustrated in FIG. 2 also includes an information processing device for processing the geographic and positional information so as to locate a plurality of facilities in the region such that the access times required by users to access the facilities are within a permissible range. Each of the steps being performed by the information processing apparatus illustrated in FIG. 2 are described below.

First, the geographical information 32 on a region in which the fire extinguishers are to be installed is read from the memory 30 and inputted into an information processing device 10 (step 100). The geographical information 32, as shown in FIG. 6, includes positional and attribute information of existing fire extinguishers in the region, positional and attribute information of residents as the users of the fire extinguishers, and information on roads and rivers in the region. Information thus read out is displayed as a map on the output device 40.

Next, a planner enters a budget for implementing the fire extinguisher locating plan, if appropriate, through an input device 20 (step 102). The input device 20 may include a keyboard and a mouse.

Then, a facility locating program 34 is read from the memory 30 and is run on the information processing device 10. Data read out at step 100 is referred to judge if there is any existing fire extinguishers (step 104). When there is no existing fire extinguisher, it is planned to install an arbitrary number of fire extinguishers. First, the planner enters the number of fire extinguishers K via the input device 20 (step 106). At this time, if the cost for installing K fire extinguishers exceeds the budget entered at step 102, the planner is prompted to enter a smaller value K. Then, a K average algorithm performs clustering of the residents distributed in the area into K clusters, using their positional information (step 108). The K average algorithm proceeds as follows:

| Step 1: | Select K centers of cluster arbitrarily. K is the number of clusters the operator wants to have. Centers: $Z_1(1), Z_2(1), \ldots, Z_k(1)$. |
|---|---|
| Step 2: | Divide whole samples $\{x\}$ into K clusters. if $\|x-Z_j(k)\| < \|x-Z_i(k)\|$, $x \in C_j(k)$. $i = 1, 2, \ldots, K$ ($i \neq j$) $C_j(k)$: Cluster whose center is $Z_j(k)$ |
| Step 3: | Find a sample as the new center of $C_j(k)$, in order to minimize J. $J_j = \sum_{x \in S_j(k)} \|x - Z_j(k+1)\|^2$ $j = 1, 2, \ldots, K$ The new center: $Z_j(k+1)$ $N_j$: number of $S_j(k)$, If |
| Step 4: | $Z_j(k+1) = Z_j(k)$, quit. Otherwise, return to Step 2. |

The simple clustering method could also be used to perform clustering of the residence. The simple clustering method takes as a sample the positional information of each resident and determines whether a cluster can be made with residence having a distance from the initial resident less than a predetermined threshold. If such a cluster cannot be made then positional information of the next resident is used.

The above-described clustering methods are disclosed, for example, in M. Nagao, *Pattern Information Processing*, published by Corona Publishing Company, 1983.

The center of each cluster is registered as a fire extinguisher installation location in the plan (step 110). At this time, the cost for newly installing the fire extinguishers is calculated. Next, according to the positions of the existing fire extinguishers or new installation locations determined at step 110, the range of users of each fire extinguisher, i.e., a user area, is determined (step 112). Examples of methods of determining a user area will be described below, referring to FIGS. 7A and 7B.

Figure 7A:
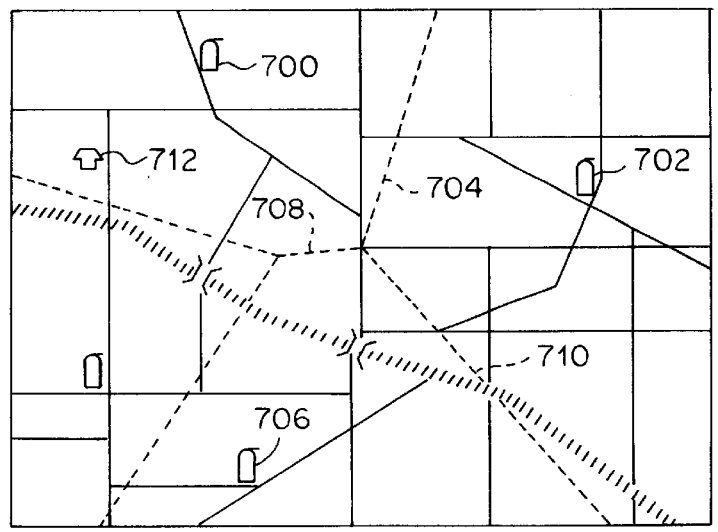
FIGS. 7A and 7B are diagrams of displays illustrating the process of determining user areas according to the present invention.
Figure 7B:
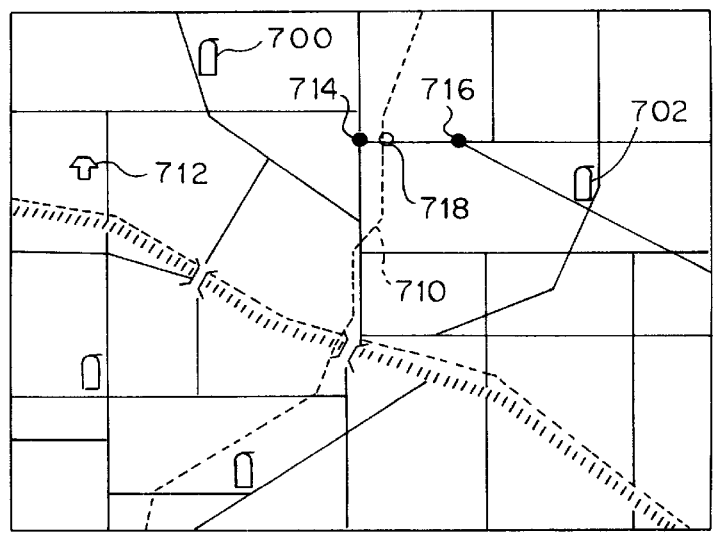

First, in FIG. 7B by using road data included in the geographical information 32, the shortest paths from each fire extinguisher to all nodes of roads in the area are calculated. Each of the shortest paths through which the node in question can be reached in a minimum time is determined based on such information as the length of the path, the width of the road used and the traffic. When the objective area is large, the extent to which the shortest path is calculated is limited beforehand. Next, for each node, a fire extinguisher to which the access time is the shortest is determined. Then the node is judged to belong to the user area of that fire extinguisher. If both nodes of the same road belong to different user areas, the road is internally divided according to the distance from each node to the fire extinguishers and the internally divided point is placed on the border of the user areas. For example, in FIG. 7B, when a node 714 belongs to the user area of a fire extinguisher 700 and a node 716 to the user area of a fire extinguisher 702, the internally divided point 718 is determined in such a way that the relation m+m'=n+n' holds, where m is the distance from 714 to 700, n is the distance from 716 to 702, m' is the distance from 714 to 718, and n' is the distance from 716 to 718. By connecting the internally divided point thus obtained and the nodes of the user areas including the nodes, the border of a user area 710 is determined. The border of the user area 710 is displayed on the output device 40, being overlaid on the already displayed map information.

There are several other methods of determining user areas. For example, there is the Voronoi method in which the borders of the user areas are set so as to bisect at 90° a straight line connecting two facilities such as that illustrated in FIG. 7A. Thus if a straight line was to be drawn connecting the fire extinguisher 700 to the fire extinguisher 702 then the border 704 is drawn so as to bisect at 90° the line connecting fire extinguishers 700 and 702. A circle method can also be used wherein the user areas are defined by circles having a predetermined radius from a fire extinguisher.

Referring to the positional information of individual residents, the user areas to which they belong are determined (step 114). In FIGS. 7A and 7B, because a resident of a house 712 belongs to the user area of the fire extinguisher 700 and the fire extinguisher 700 is the one to which the access time for the resident is the shortest, the resident is quite likely to use the fire extinguisher 700. The time taken from the position of each resident or the residence to the fire extinguisher is evaluated (step 116). Because at step 114 the fire extinguisher most likely to be used by the resident is specified, the calculation and evaluation of the access time to the fire extinguisher is performed only for the fire extinguisher.

A method of evaluation is explained referring to FIG. 3. First, the planner enters an evaluation standard via the input device 20 (step 300). For facilities that are used in case of emergency, such as fire extinguishers, in particular, a permissible range of access times required to access the facilities are set as necessary. Then, the length of the path to the fire extinguisher in the user area is calculated for each resident (step 302). The attribute information of the user is referred to (step 304) and the access time to the facility is calculated with the length of path and the attribute information taken as parameters (step 306). The attribute information that is referred to includes, for example, information on the user's age. If the user is very old, the access time is set a little longer than calculated.

Figure 8:
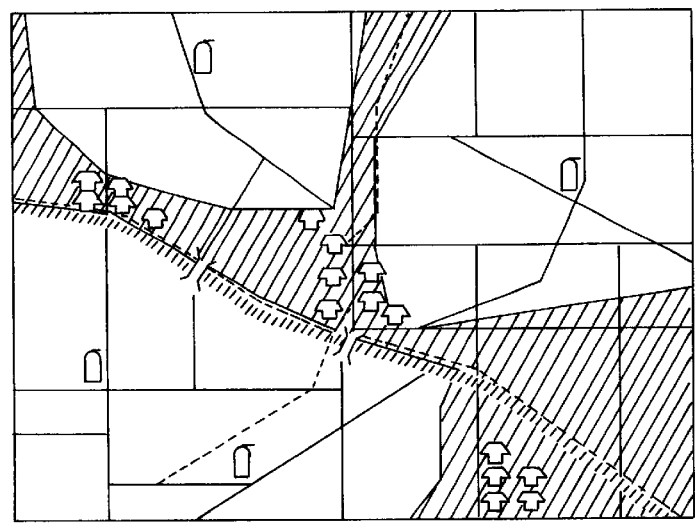
FIG. 8 is a diagram of a display illustrating a zone where user access times fall within or exceed the permissible range according to the present invention.

Walking up or down stairways in buildings, walking on roads with heavy traffic or with many corners, crossing rivers, and physical disabilities of the user all increase psychological burden on the user in the event of disaster, which very likely increases the access time. Thus, the height of the building where the user lives and the conditions of the path leading to the fire extinguisher are also taken as parameters. Finally, according to the evaluation standard entered at step 300, an evaluation value is given to the time (step 308). At this time, when only the positions of users whose access times to the fire extinguisher exceed the permissible range need to be extracted, it is possible to predetermine by calculation a zone in each user area in which the times fall well within the permissible range, and to omit the calculation and evaluation of the access times for the users in the zone unless there are disadvantageous attributes such as advanced age. FIG. 8 shows the result of determining the zone where the access times fall within the permissible range. Zone 800 is a zone outside the permissible range. By performing evaluation on only the users included in zone 800, it is possible to pick up efficiently the users whose access times to the facilities exceed the permissible range. After having evaluated the access times to the facility for all users, the evaluation value given to each user is displayed on the output device 40, being overlaid on the map.

The evaluation of access time required to access a facility is performed as follows:

Step 1: Calculate the distance (D) (straight course/by route) from a user to the nearest (with the smallest cost) facility. The nearest facility has already decided by the step of determining user areas.
    Case 1: Straight course:

$$D = \sqrt{(U_x - f_x)^2 + (U_y - f_y)^2} + |U_z - f_z|$$

Position = coordinate: User ($U_x$, $U_y$, $U_z$) Facility ($f_x$, $f_y$, $f_z$)
    Case 2: By the shortest course according to road network
    D can be calculated by Dijkstra method.
    D = route 1 + route 2 + . . . + route N + |$U_z$ − $f_z$|
    route i (i = 1, 2, . . . N) consists of the surface shortest course.
Step 2: Set the user's speed(S) according to his/her attribute.
    Example
    - Is he/she handicapped or older than 60?
      - If YES, set the speed "slow".
      - If NO, set the speed "normal".
Step 3: Set the permissible time (T) to access the facility according to the material/structure of the building in which the user lives in.
    Example
    - Identify the number of the building in which the user lives.
    - Examine the material of the building from the database of the buildings in the area.
    - Is the material wood easy to burn?
      - If YES, set the permissible time "short".
      - If NO, set the permissible time "normal".
Step 4: Calculate the access time required for the user and evaluate it according to the permissible time.
    - D/S ≦ T ?
      - If YES, value for the user is "good".
      - If NO, value for the user is "bad".
Alternatively at Step 4, if the facilities have limited capacity for each, evaluation can be done as follows:
    - Calculate D/S, t for each user who belongs to a user area.
    - Arrange the data of users according to his/her t value
    - for each user (in order of t)
      - Is the number of users in good condition smaller than the facility's capacity?
        - If YES, t ≦ T?
          - If YES, value for the user -continued is "good".
- increase the number of
  users in good condition.
- If NO, value is "bad".
- If NO, value is "bad".

Alternatively at Step 1, distance can be determined as follows:

Case 1: Straight course $$D = \sqrt{(Ux - fx)^2 + (Uy - fy)^2} + P|Uz - fz|$$

Case 2: By the shortest course on road network
    D = C (route 1 + route z + . . . + route N) + P | Uz − fz |
    C: the condition of the streets the user passes through.
        Examples:
        - traffic volume, bending, the number of obstacles (river, etc.)
          C = TV1 · L1 + TV2 · L2 + . . . + TVN • LN
          TV: traffic volume
          L: length of each route.
          P. mental or physical pressure on user during going up/down.

Watching the evaluation result displayed, the planner decides whether or not to approve the locations of the facilities currently displayed (step 120). When the planner approves them, the facility location is recorded on the map as the facility location plan 36 (step 122). When the current facility location is based on the new installation locations determined at step 110, the cost for new installation is subtracted from the budget (step 124). When the location of the existing fire extinguishers is recorded as is, the cost is not subtracted.

Next, when the planner decides to newly draw up a plan and change the locations of the fire extinguishers to shorten the access times required for the users to go to the fire extinguishers (step 126), the facility locating program 34 makes a plan based on the budget entered at step 102 (step 128). The planning will be described below, referring to FIG. 4.

First, if there is any place where the planner considers that to relocate or set up of a fire extinguisher is necessary, he or she indicates the location on the map displayed on the output device 40 by using the input device 20 such as a mouse (step 400). For facilities whose accommodation capacity is limited, such as hospitals, facilities whose stock is limited, such a storage of provision for disaster, and facilities whose delivery capacity is limited, such as stores offering home delivery services, only the users whose access times are rather short may use such facilities, and hence the planner may plan not only relocation and new set-up of facilities but expansion of them in terms of accommodation capacity, stock and delivery capacity for the convenience of those whose access times are long. After this, the cost for implementing what are specified is calculated (step 402) and the planning is completed.

When no manual entry is made, the facility locating program 34 determines the locations where fire extinguishers are to be moved or set up. If all residents in the user area of a certain fire extinguisher are judged to be able to reach the fire extinguisher in an adjacent user area within a permissible range of time, there arises no problem even if the fire extinguisher in the user area to which they belong is removed. Therefore, to eliminate redundant installation of the facilities, the fire extinguisher may be removed. The removed fire extinguisher is reused for new installation at another location as required. The cost for the removal is subtracted from the budget. Similarly, for facilities other than fire extinguishers having attributes such as accommodation capacity and stock, the size or capacity of the facilities can be reduced.

Figure 9:
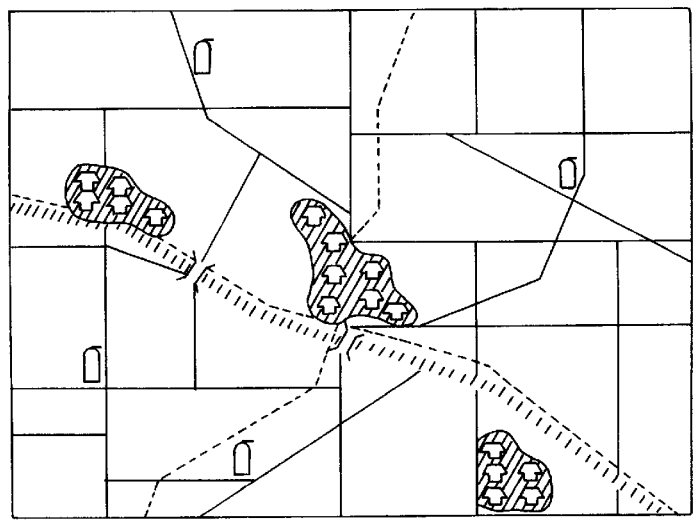
FIG. 9 is a diagram of a display illustrating groups of users whose access times exceed the permissible range according to the present invention.

In relocating or establishing facilities, the first step is to pick up only the users whose access times, evaluated for each user at step 116, exceed the permissible range and, based on the information on their positions, the users are clustered (step 404). The clustering is done by determining from the budget the upper limit K of the number of locations where fire extinguishers are newly installed by a K average algorithm. FIG. 9 is an example of grouping on the map the residents whose access times required to the facility exceed the permissible range into three clusters. Designated 900 are clusters of residents whose access times to the facility exceed the permissible range.

Next, the user area to which the center of each cluster belongs is determined (step 406) and the cost-benefit t when the facility in the user area is relocated is calculated (step 408). The process of determining the cost-benefit will be described below, referring to FIG. 5.

First, in FIG. 5 the number of residents in a cluster is calculated (step 500). Next, pick up the users in the user area and adjacent user area whose user times exceed the permissible range (step 501). Then the location to which the facility is to be moved is postulated (step 502). At this time, the facility is relocated toward the center of the cluster and the relocation factor of the facility is determined according to the number of residents calculated at step 500 in such a way that the relocation factor increases with the number of residents. Next, the cost of relocation to the position postulated at step 502 is calculated (step 504) and a check is made if the cost is within the budget (step 506). When the cost exceeds the budget, the facility relocation cannot be implemented and therefore the cost-benefit t is set to 0 (step 508), and the processing is terminated. When the relocation can be made within the budget, first the residents, whose access times to the facility exceed the admissible range, in a user area of the cluster center and in an adjacent user area are determined, then the times for the residents to go to the relocated facility are estimated; and the total number of residents q whose access times, shortened and fall in the admissible range (step 512). Thereafter, the ratio of q to the relocation cost obtained at step 504 is calculated and used as the cost-benefit t (step 514). Thereafter, this processing is ended.

Similarly, when a fire extinguisher is newly installed at the center of the cluster, a cost-benefit is calculated (step 410). When the facility is other than a fire extinguisher and has attributes such as accommodation capacity and stock, a cost-benefit e is also determined in the case where the facility in the user area to which the cluster center belongs is expanded (step 412).

A maximum cost-benefit m is selected from among the cost-benefits t, a and e (step 414) and the most effective implementation, relocation, establishment or expansion, is chosen. The processing 414 is carried out for all clusters, a maximum cost-benefit M is selected from among the maximum cost-benefits m of all the clusters (step 416). Relocation, establishment or expansion of the facility that brings about M is determined as a top-priority plan (step 418), ending the processing.

Figure 10:
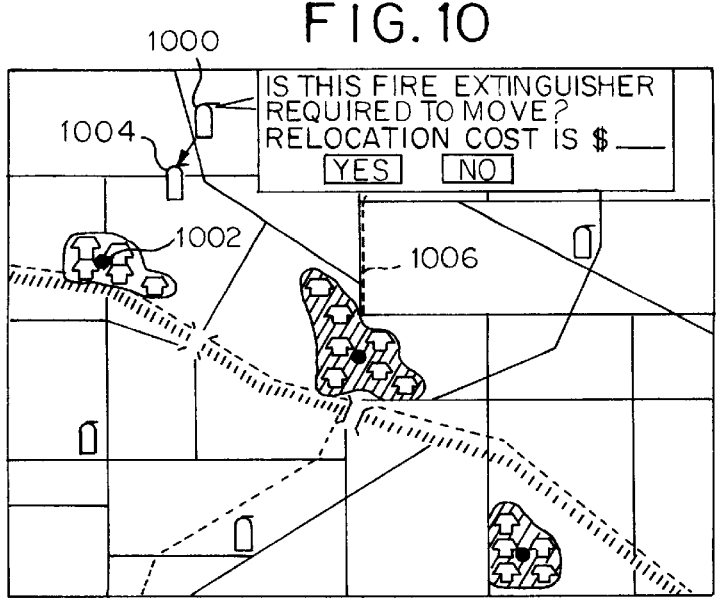
FIG. 10 is a diagram of a display illustrating a process of relocating facilities according to the present invention.

The contents of the plan and the implementation cost are displayed on the map on the output device 40 (step 132) to evaluate the access times required for the residents to go to the fire extinguisher when the plan is implemented (step 112, 114, 116). FIG. 10 is an example of display illustrating the contents of a plan for relocating the fire extinguisher 1000 toward the center of the resident cluster 1002, the cost of implementing the relocation plan, and the result of evaluation of the times when the facility relocation is implemented. From the number of residents included in the cluster whose center is located at 1002, the relocation factor of the fire extinguisher is calculated and the place of relocation 1004 is postulated. The border 1006 of the user area when relocation is implemented is determined, and the access times required to the fire extinguisher 100 for the users in the associated user area or, if necessary, in the adjoining user area are evaluated. FIG. 10 illustrates the evaluation result that the access times required to go to the fire extinguisher 1004 for the users included in the cluster whose center is 1002 can be shortened to a permissible range.

Figure 11:
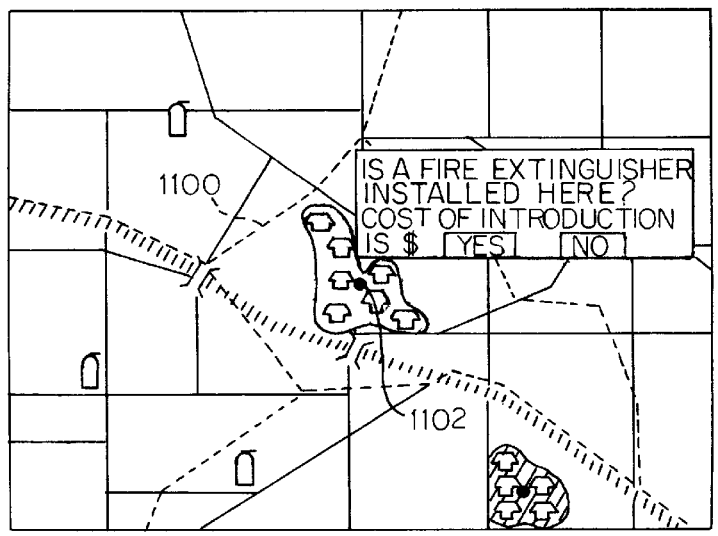
FIG. 11, is a diagram of a display illustrating a process of establishing facilities according to the present invention.

Likewise, FIG. 11 is an example of display illustrating the contents of a plan for establishing a fire extinguisher at the center of the resident cluster 1102, the cost of implementing the plan, and the result of evaluation of the access times when the facility is established. A new border of the user area 1100 is determined and the evaluation result is displayed indicating that the access times to 1102 for the residents included in the cluster whose center is 1102 are within an admissible range. The planner, watching the evaluation result displayed at step 118 as shown in FIGS. 10 and 11, judges if the plan should be executed or not. If the planner judges that the plan should be implemented, the planner approves the contents of the plan (step 120), records them in the facility location plan 36 (step 122), and subtracts the cost of implementing the plan from the budget (step 124).

If the planning continues further, at a step 128 a plan that brings about a maximum cost-benefit M is made. If in this case the plan that is drawn up through steps 404 to 418 is not approved and the locations of fire extinguishers are not changed, the second highest cost-benefit among already determined m for clusters is taken as a new M (step 416) and the plan M is adopted as the next one unless manual entry is made at step 400 (step 418). Then the processing is ended.

In this way, the planner repeats the planning and evaluation procedure a desired number of times. It is noted, however, that when the cost-benefit M is equal to 0 because of short of budget or the access times for all residents in the cluster being in the permissible range (step 130), the planning procedure is ended.

FIGS. 12A and 12B further illustrates a situation where a new fire extinguisher is installed at the center of the resident cluster 1202 whose access times exceed the permissible range. As can be seen in FIG. 12A the center of the resident cluster 1202 is identified. Then, a new fire extinguisher 1206, as illustrated in FIG. 12B, is installed at the center of the resident cluster 1202.

The present invention allows the access time for the user to go to the facility to be evaluated for each user, making it possible to accurately determine the locations of clusters of the users whose access times exceed the admissible range. This further permits the planner to find the locations accurately where establishment, relocation or expansion of the facility is needed. Further, in terms of service to the users, when a local government pays subsidy for purchasing a fire extinguisher to the users whose access times exceed the admissible range, it is possible to pick up the objective residents, thus improving the service.

It is further possible to reduce the time required for evaluation even when there are large numbers of users and facilities, by calculating a user area and limiting the location of the facility that is very likely to be used by each user to a user area where the user belong or to the adjoining user area. Further, because the planning is carried out according to the evaluation standard and budget entered by the planner, and the contents of the plan can be entered manually, the planning can be done flexibly reflecting the intention of the planner saving the labor. The evaluation and planning can be repeated a desired number of times to draw up an optimum plan.

While the above description has been made of a case of locating fire extinguishers as a disaster provision for public use. The present invention can be applied to planning of locating a variety of other facilities. For example, when the fire extinguishers in the above embodiment are replaced with schools or hospitals whose accommodation capacities are limited, it is possible to determine the users who cannot use the facilities, by performing evaluation on the number of users in the user area in view of the accommodation capacities as well as the evaluation of the times to the facilities. Another example is support of business activities, effected by determining the user areas for branch offices of a bank or for chain convenience stores, and improving their availability for users such as the access times to the facilities by postulating the residents and companies as the users.

The user areas of chain stores are determined by using as parameters the expenses of transportation to the stores, the service rates, the prices of goods sold in the stores as well as the times to the stores. The evaluation is performed in consideration of these parameters for individual users. During the planning, attribute information on the incomes of households and companies, the number of members of the households and companies and their ages are referred to, the users whose ages fall in a range on which the goods are targeted and who have purchasing power are extracted and clustered, and the locations where stores need to be moved, set up or expanded are determined.

Another example is vehicles such as patrol cars, taxis and business cars. Position information about each moving vehicle is collected at specified time intervals to determine its user area. Taking the households and corporations in the user area as the users, the vehicles are spread out in such a way as to be able to quickly respond to calls from the users. In this way, the public services and business activities can be supported. In this case, it is also effective to handle railway stations as groups of users because many people gather at stations. As to users, the attribute information such as past records of use may be referred to so as to determine for every specified time zone the users whose frequencies of use are high and thereby to determine the locations where vehicles are spread out. As described above, because the present invention permits the access times required for actual units such as individual users to go to a facility to be calculated, it is possible to accurately locate the positions of the users whose access times exceed the admissible range and therefore determine the locations where the facility needs to be moved, newly installed or expanded. Hence, the facility location planning can be made in such a way as to allow an increase in the number of users of the facility and to improve the availability of the facility to the users. This contributes to improving public services and increasing the profits of private enterprises.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. In an information processing apparatus including a processing device, an input device, an output device and a memory having stored therein geographic information of a region including positional information of existing facilities in said region and positional information of users of said facilities, a method of locating a plurality of facilities in said region such that access times required by said users to access said facilities are within a permissible range, comprising the steps, performed by said information processing apparatus, of:

calculating user areas corresponding to said facilities using said geographic information;

determining for each user area which of said users belong to said user area using said geographic information;

calculating for each user of each user area an access time required by said user to access a facility belonging to said user area using said geographic information;

judging whether said access time of each user of each user area is within said permissible range;

determining a group of users for each user area whose access times exceed said permissible range using said geographic information;

calculating a point representing a position of said group of users whose access times exceed said permissible range using said geographic information; and establishing a facility at said point or relocating a facility in said user area to which said group of users whose access times exceed said permissible range belongs such that said access times for each user of said group of users whose access times exceed said permissible range come within said permissible range.

2. A method according to claim 1, wherein said establishing or relocating step comprises a step, performed by said information processing apparatus, of:

expanding the scale of said facility in said user area to which said group of users belongs or expanding a facility in a user area adjacent said user area to which said group of users belongs in accordance with the number of users included in said group of users.

3. A method according to claim 1, wherein said step of calculating access times calculates access times using attribute information of each user along with said positional information.

4. A method according to claim 1, wherein said step of calculating access times is replaced by a step of calculating a total cost of expenses of transportation to said facility belonging to said each user area, a charge for using said facility belonging to said each user area and prices of goods available at said facility belonging to said each user area.

5. A method according to claim 1, wherein when there are no existing facilities, users whose positions are close to each other are grouped into an arbitrary number of user groups, points representing positions of user groups are calculated, and facilities are newly set up at said points.

6. A method according to claim 1, wherein in said user area of each facility, regions where an access time required for users to go to said facility is within said permissible range are identified, and users located in said regions are excluded from users used in said step of determining groups of users whose access times exceed said permissible range.

7. A method according to claim 2, wherein setting said permissible range, relocating of said facility, establishing a facility, and expanding the scale of a facility are all performed according to a standard set by a planner of a facility location plan and an implementation budget.

8. A method according to claim 1, further comprising the steps, performed by said information processing apparatus, of:

manually specifying facilities which are to be relocated, established and changed in scale in response to a planner of a facility location plan.

9. A method according to claim 1, further comprising the steps, performed by said information processing apparatus, of:

evaluating said relocating and establishing based on a plan.

10. A method according to claim 9, further comprising the steps, performed by said information processing apparatus, of:

performing said evaluating step repeatedly.

11. An information processing apparatus comprising:

an input device for inputting data;

an output device for outputting data;

a memory having stored therein geographic information of a region including positional information of existing facilities in said region and positional information of users of said facilities; and an information processing device, connected to said input and output devices and said memory for processing said geographic and positional information so as to locate a plurality of facilities in said region such that access times required by said users to access said facilities are within a permissible range, wherein said information processing device calculates user areas corresponding to said facilities using said geographic information, determines for each user area which of said users belong to said user using said geographic information, calculates for each user of each user area an access time required by said user to access a facility belonging to said user area using said geographic information, judges whether said access time of each user of each user area is within said permissible range, determines a group of users for each user area whose access times exceed said permissible range using said geographic information, calculates a point representing a position of said group of users whose access times exceed said permissible range, and establishes a facility at said point or relocates a facility in said user area to which said group of users whose access times exceed said permissible range belongs such that said access times for each user of said group of users whose access times exceed said permissible range come within said permissible range.

12. An apparatus according to claim 11, wherein said establishing or relocating operations performed by said information processing device includes an operation of expanding the scale of said facility in said user area to which said group of users belongs or expanding a facility in a user area adjacent said user area to which said group of users belongs in accordance with the number of users included in said group of users.

13. An apparatus according to claim 11, wherein said calculating access times operations performed by said information processing device includes an operation of calculating access times using attribute information of each user along with said positional information.

14. An apparatus according to claim 11, wherein said calculating access times operation performed by said information processing device is replaced by an operation of calculating a total cost of expenses of transportation to said facility belonging to said each user area, a charge for using said facility belonging to said each user area and prices of goods available at said facility belonging to said each user area.

15. An apparatus according to claim 11, wherein when said information processing device determines there are no existing facilities, users whose positions are close to each other are grouped into an arbitrary number of user groups, points representing positions of user groups are calculated, and facilities are newly set up at said points.

16. An apparatus according to claim 11, wherein said information processing device identifies, in said user area of each facility, regions where an access time required for users to go to said facility is within said permissible range are and users located in said regions are excluded from users used in the operation of determining groups of users whose access times exceed said permissible range.

17. An apparatus according to claim 12, wherein said information processing device performs the operations of setting said permissible range, relocating of said facility, establishing a facility, and expanding the scale of a facility according to a standard set by a planner of a facility location plan and an implementation budget.

18. An apparatus according to claim 11, wherein said information processing device further performs an operation of manually specifying facilities which are to be relocated, established and changed in scale in response to a planner of a facility location plan.

19. An apparatus according to claim 11, wherein said information processing device further performs an operation of evaluating said relocating and establishing based on a plan.

20. An apparatus method according to claim 19, wherein said information processing device performs an operation of performing said evaluating step repeatedly.

21. A method according to claim 3, wherein said attribute information of each user includes the age of said user.

22. A method according to claim 3, wherein said attribute information of each user includes the height of the building where said user lives.

23. A method according to claim 3, wherein said attribute information of each user includes information regarding the condition of paths and roads leading to a facility belonging to the corresponding user area.

24. An apparatus according to claim 13, wherein said attribute information of each user includes the age of said user.

25. An apparatus according to claim 13, wherein said attribute information of each user includes the height of the building where said user lives.

26. An apparatus according to claim 13, wherein said attribute information of each user includes information regarding the condition of paths and roads leading to a facility belonging to the corresponding user area.

* * * * *